United States Patent

[11] 3,589,482

| [72] | Inventor | Clement Walker Weston, Jr.<br>New Orleans, La. |
|---|---|---|
| [21] | Appl. No. | 874,285 |
| [22] | Filed | Nov. 5, 1969 |
| [45] | Patented | June 29, 1971 |
| [73] | Assignee | Corinth Machinery Company, Inc.<br>Corinth, Miss. |

[54] AIR OPERATED MOTOR AND BRAKE WITH MODULATING CONTROL SYSTEM
8 Claims, 3 Drawing Figs.

[52] U.S. Cl. ................................................. 192/3 R,
143/120 A, 303/20, 192/142
[51] Int. Cl. .................................................. F16d 67/00
[50] Field of Search ........................................ 192/3, 142;
143/118, 120 A

[56] References Cited
UNITED STATES PATENTS
2,741,702 4/1956 Keen ........................... 192/3

| 2,831,554 | 4/1958 | Reynolds | 192/3 |
|---|---|---|---|
| 2,947,392 | 8/1960 | Heine | 192/3 |
| 3,380,495 | 4/1968 | Weston, Jr. | 143/120 |
| 3,439,579 | 4/1969 | Guinot | 192/3 (X) |

Primary Examiner—Benjamin W. Wyche
Attorney—B. P. Fishburne, Jr.

ABSTRACT: A computerized electronically controlled setworks contains an air motor for driving the set shaft and an airbrake for such shaft. The airbrake for the set shaft has its operation modulated during deceleration so that with a large heavy log, deceleration will be relatively little whereas with a lighter log, deceleration will be relatively great. This modulation of the brake is accomplished by detecting speed according to the volume of exhaust air flowing from the air motor. A back pressure is imposed upon the motor which provides simulated loading of the system when activation of the airbrake is desired.

PATENTED JUN 29 1971

INVENTOR
C. W. WESTON, Jr.

BY *B. P. Fishburn, Jr.*
ATTORNEY

AIR OPERATED MOTOR AND BRAKE WITH MODULATING CONTROL SYSTEM

The invention constitutes an improvement of the digital electronic setworks control for sawmills in U.S. Pat. No. 3,380,495, issued to C. W. Weston, Jr. on Apr. 30, 1968, and finds particular utility in connection with the patented structure but is not limited to use with such structure.

In the Weston patent, which is totally incorporated in this application by reference, when a "set" was initiated, the brake on the head or set shaft was released and the air motor proceeded to drive the head blocks forward at high speed. At a point approximately one-half inch from the completion of the set, the electronic system signalled the motor to slow down, while at the same time applying low pressure braking to the set shaft. As the set was completed, the high pressure air supply was ducted to the brake, locking the set shaft in the final position at the completion of the set.

It has now become evident that it would be desirable to have the airbrake of the system so controlled that deceleration of the head blocks would be relatively great when little or no load is on the head blocks, and relatively small when a large load (log) is on the blocks. The present invention provides this capability for the prior patented machine, or for similar instrumentalities, by modulating the operation of the brake during the deceleration so that deceleration will vary in accordance with the load seen or felt by the air motor. As the speed of the motor is to some degree a direct function of loading in the system, it is possible to utilize speed for detecting the load and controlling brake modulation. The invention provides a highly simplified and economical arrangement for accomplishing this which actually eliminates one solenoid-operated valve from the patented machine and removes all but one adjustment from the circuit.

Basically, therefore, the present invention brake modulating system is based on detection of speed in accordance with the volume of exhaust air flowing from the set shaft air motor. If the motor is lightly loaded, compressed air flowing therethrough will undergo a relatively small pressure drop through the motor, and experience a much larger pressure drop in the exhaust side valving. Conversely, a heavily loaded air motor will show a great pressure drop across the motor and a low drop across the valving on the exhaust side. In the system of the invention, the deceleration period necessitates the imposition of back pressure on the motor which will produce a synthetic or simulated loading of the system, and at the same time, inflation of the airbrake is desired. The essence of the new system is to utilize these two requirements simultaneously and by means of the same valving. When the air motor is lightly loaded, it will be seen that a large volume of air will escape on the exhaust side of the motor. If an obstruction to this exhaust is suddenly imposed by the new valving of the invention, then pressure will build up very rapidly on the exhaust side, tending to slow the motor. This pressure will simultaneously be applied to the airbrake which will further act to slow the motor. The amount of back pressure may diminish as the air motor is slowed. Imagine, for example, that the load on the head blocks should suddenly meet an increase in friction as it slides on the carriage ways. Should such a load increase cause the motor to approach a stall, the back pressure, which would then be imposed on the motor and airbrake, would diminish automatically to nearly zero. Under this condition, the air motor is free to impose full torque on the set shaft in order to complete the set.

The system of the invention is extremely attractive in that it requires no additional logic or electronics and may be applied to new or existing machines.

Other objectives and advantages of the invention will be apparent during the course of the following description.

BRIEF DESCRIPTION OF DRAWING FIGURES

DETAILED DESCRIPTION

Figure 1:
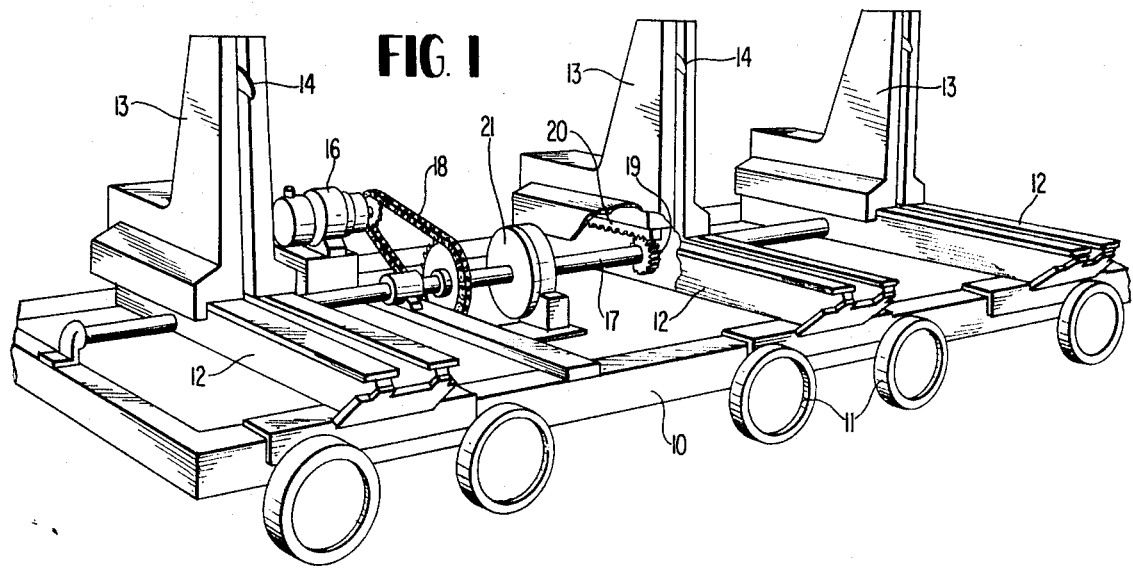
FIG. 1 is a fragmentary perspective view of a sawmill carriage and setworks as contained in Pat. No. 3,380,495.

Referring to the drawings in detail, wherein like numerals designate like part, the numeral 10 designates a sawmill carriage having wheels 11 engaging a track or guide, not shown. Head block guides 12 are provided on the carriage and a corresponding number of head blocks 13 slidably engage these guides. The head blocks are equipped with the usual dogs 14 to clamp the log, not shown, resting on the guide or bases 12 and resting against the vertical faces of the head blocks. The machine further comprises an air motor 16 mounted suitably on the carriage and coupled to the head or set shaft 17 through suitable gearing 18. The shaft 17 carries a spur gear 19 beneath each head block 13 to drive the latter by meshing with a gear rack 20 on the bottom thereof. An airbrake 21 of a known type is located on the set shaft 17 to control the linear movement of the head blocks 13 upon command by arresting rotation of the set shaft. The construction thus far described is conventional and corresponds substantially to the description of corresponding parts in Pat. No. 3,380,495.

Figure 2:
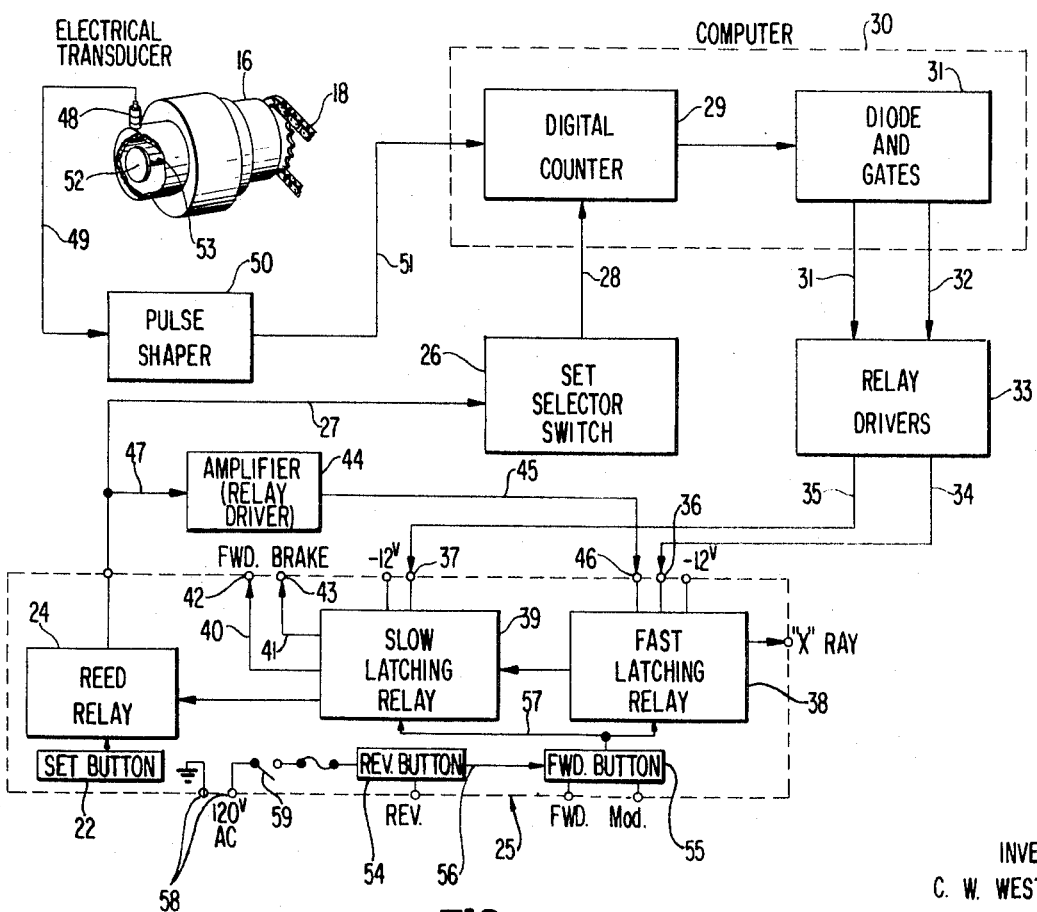
Fig. 2 is a block diagram illustrating a preferred embodiment of the present invention.

FIG. 2 shows a block diagram of the invention for controlling the movement of head blocks 13 by selective control of the operation of air motor 16 and airbrake 21. The system in FIG. 2 differs only slightly from the corresponding system shown in FIG. 2 of Pat. No. 3,380,495. In FIG. 2, a set button 22 located on a chassis 25 is coupled to a reed relay 24, in turn coupled with a set selector switch 26 through a circuit lead 27. Another lead 28 interconnects set selector switch 26 with a digital counter 29 in a computer 30 having diode AND gates 31, the latter being electrically coupled through leads 31' and 32 with relay drivers 33. Circuit leads 34 and 35 from the relay drivers connect with terminals 36 and 37 of fast latching relay 38 and slow latching relay 39. Relay 39 is coupled to the relay 38, as shown, and through a pair of leads 40 and 41 is connected with a pair of terminals 42 and 43. An amplifier 44 has been added to the system shown in Pat. No. 3,380,495 in order to guarantee reed relay operation before the latching relays are pulled in. This prevents any serious misset in case of failure of the reed relay to make prior to operation of the controlled rectifier associated therewith, or in case of total failure of the reed. The amplifier 44 is connected by a lead 45 with another terminal 46 of relay 38, as shown, and is also linked to the reed relay via a lead 47.

An electrical transducer 48 on the air motor 16 is connected through a lead 49 with a pulse shaper circuit 50, in turn connected through a lead 51 with the digital counter 29 of the computer. The transducer 48 responds to a gear 52 on the main shaft 53 of the air motor and this gear has a predetermined number of teeth. The electrical transducer produces a pulse whenever one tooth of the gear 52 passes under he transducer head. These elements correspond to the description of corresponding elements in Pat. No. 3,380,495. Reverse and forward buttons 54 and 55 are conveniently mounted on the chassis 25 and are coupled by a lead 56. The forward button 55 is coupled to relays 38 and 39 through another circuit lead 57. The chassis 25 is powered with 120 volts AC through terminals 58 on the chassis and a power switch 59 is also provided.

Figure 3:
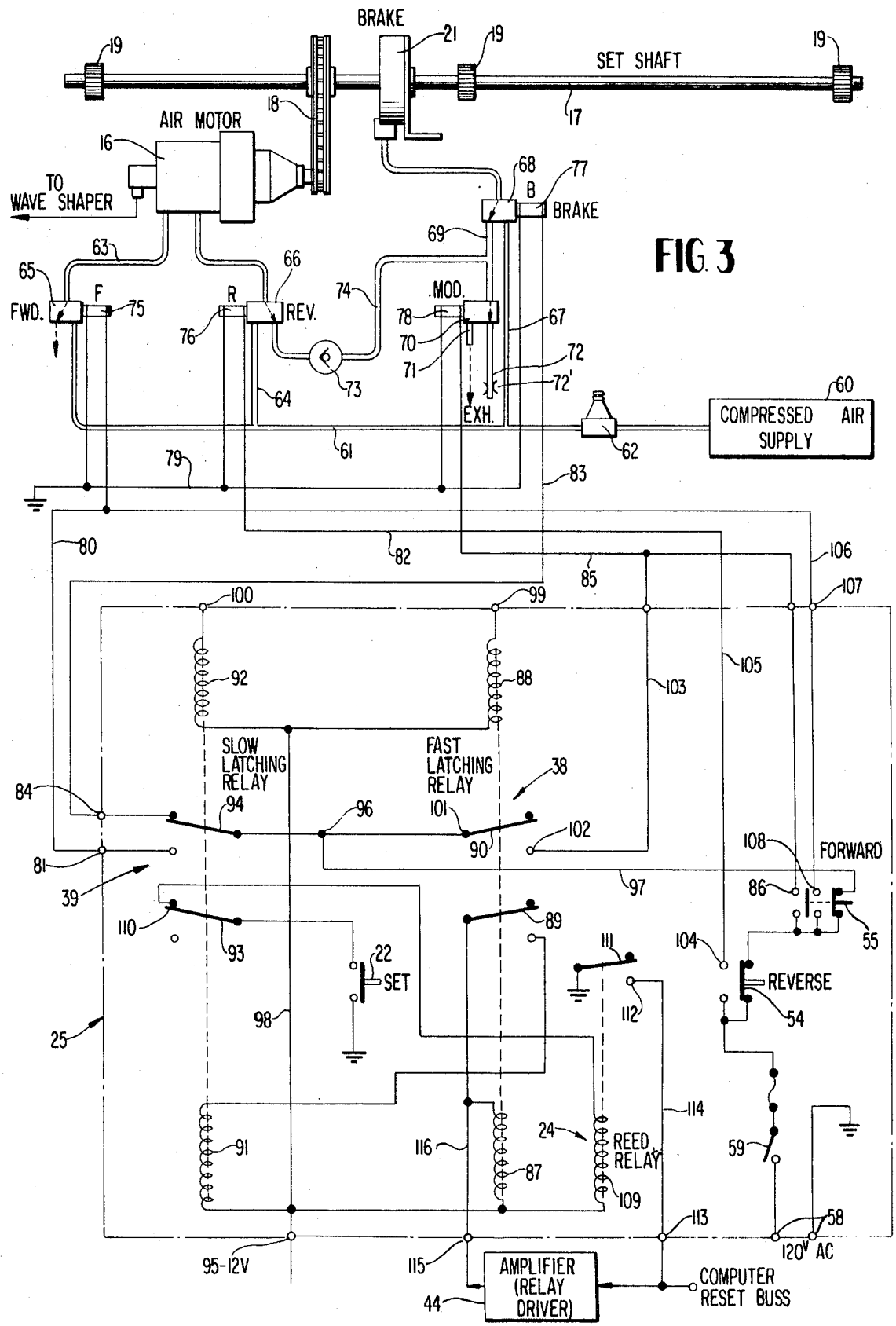
FIG. 3 is an electromechanical schematic showing the brake modulating system incorporated in the control apparatus for the setworks in Pat. No. 3,380,495.

Referring to FIG. 3, the arrangement is shown by which the air motor 16 and airbrake 21 are controlled by fast latching relay 38 and slow latching relay 39. In this system, the air motor and airbrake are powered by compressed air from a supply source 60 through an air line 61 having a main control valve 62 therein. As shown, the line 61 is connected with the motor 16 through branch air lines 63 and 64 having forward and reverse solenoid-operated valves 65 and 66 therein. The brake 21 for shaft 17 is similarly connected to the main air line 61 through a branch line 67 having a brake solenoid-operated valve 68 connected therein. An exhaust line 69 leading from the brake valve 68 is connected with a brake modulating solenoid valve 70 having an open exhaust 71 and a variable back pressure exhaust 72 by means of which deceleration of the head blocks 13 may be regulated under some circumstances. A one way active check valve 73 is coupled in an air line 74 between the reverse valve 66 and air line 69.

Each of solenoids 75, 76, 77 and 78, FIG. 3, has one terminal grounded through a ground line 79. The other terminal of solenoid 75 is connected with a circuit lead 80 leading to a terminal 81 on the chassis 25. The corresponding terminal of solenoid 76 is connected through a lead 82 with one terminal of reverse pushbutton 54. The corresponding terminal of solenoid 77 is similarly connected through a lead 83 with another terminal 84 on chassis 25. The corresponding terminal of solenoid 78 is connected through a circuit lead 85 to a set of terminals 86 of forward pushbutton 55.

The operating circuitry for the above-described solenoid valves is embodied in the latching relays 38 and 39. Fast latching relay 38 comprises two relay coils 87 and 88 and two sets of relay contacts 89 and 90. Slow latching relay 39 likewise comprises two coils 91 and 92 and two sets of contacts 93 and 94. These relays are so constructed that energizing of one coil for approximately 20 milliseconds will operate the relay to a first position which will be held when power is removed. When power is applied momentarily to the other coil, the relay will move to its second position where it will be latched even though deenergized. A source of negative potential is adapted to be connected to chassis 25 through a terminal 95 thereon and a source of positive potential to the terminal 96 enters through a circuit lead 97 from forward pushbutton switch 55, etc.

The relays 38 and 39 are interconnected in such a manner that relay 38 is energized first, which in turn energizes relay 39. The circuitry disclosed shows the set pushbutton 22 coupled between ground and relay contacts 93. One terminal of relay coil 87 is coupled to relay contact 89 while its opposite terminal is coupled to the terminal 95 so that a momentary closure of pushbutton switch 22 will energize fast acting relay 38 to a first latched position causing relay contacts 89 and 90 to switch to the opposite terminals from those shown in FIG. 3.

FIG. 3 further discloses the electrical connections of fast latching relay 38 and slow latching relay 39 with the described solenoid-operated valves for the air motor 16 and brake 21. With respect to relay 38, one terminal of coil 88 is connected to terminal 95 through a lead 98 while its opposite end or terminal is connected to a terminal 99 on the chassis 25. The second relay coil 92 of slow latching relay 39 has one terminal connected through lead 98 with he terminal 95 while its opposite terminal is connected to a terminal 100 on the chassis.

The relay contact 90 has its terminal 101 connected to terminal 96 to which is applied 120 volts AC. Terminal 102 is connected through a lead 103 with the lead 85 running to the solenoid 78 of brake modulating valve 70. Similarly, the terminal 104 of reverse pushbutton switch 54 is coupled through a lead 105 with the solenoid 76 of motor reverse valve 66. The solenoid 75 is connected through a lead 106 entering the chassis at 107 and connecting with middle terminals 108 of forward pushbutton switch 55.

The reed relay 24 has its coil 109 coupled across terminal 95 and terminal 110 of the slow latching relay 39. The armature 111 of reed relay 24 is connected to ground while the normally open contact 112 is coupled to a terminal 113 by a lead 114. The amplifier 44, FIG. 3, is connected across chassis terminals 113 and 115 and through a lead 116 is connected with contact 89 and coil 87.

The circuitry for the computer 30, FIG. 2, is shown substantially in FIG. 4 of Pat. No. 3,380,495 and this need not be redescribed herein for a proper understanding of the improvement. The disclosure in the patent is relied upon for an understanding of the basic mode of operation of the setworks which remains substantially unchanged by the addition of the present invention or improvement.

OPERATION OF BRAKE MODULATING SYSTEM

The valving for the motor 16 and brake 21 shown in FIG. 3 represents the sawmill setworks at rest and with power removed altogether from the electrical input. With power applied to the system by closing switch 59 and no other signal to set, jog forward or to reverse, solenoid 77 alone is energized admitting high pressure air from the line 61 to line 67 and through the valve 68 to the brake 21, and this locks the set shaft 17 in place.

Depressing the reverse pushbutton 54 will interrupt the current to solenoid 77 permitting the pneumatic brake to exhaust straight through modulating valve 70, thus releasing the shaft 17 for motion. The same button 54 will close a circuit to solenoid 76 opening valve 66 to admit high pressure air through the motor 16. At this time, exhaust air from the motor will be permitted to escape through the valve 65.

On depressing forward pushbutton 55 fully, solenoid 77 will again be deenergized, releasing the brake 21 and solenoids 75 and 78 will both be energized. High pressure air will be admitted to the motor and exhaust air will now escape through valve 66, as shown, and then through check valve 73 and the fully open port of valve 70. This condition of substantially unrestricted exhaust allows high speed forward movement of the air motor 21. If the forward pushbutton 55 is depressed only halfway, solenoid 78 will be deenergized as before. Solenoid 75 will also be energized as before but solenoid 78 will not be energized. Forward motion of the air motor 16 will be accomplished as before except that the exhaust from the motor will be obliged to pass through a restriction valve 72' of the variable back pressure exhaust line 72, previously noted in FIG. 3. This is the regulator means for deceleration of the head blocks 13. The amount of restriction to the exhaust from the air motor 16 is adjustable at the valve 72' and it should be noted that the pressure drop which is developed across this valve will be imposed back on the brake 21. Thus, if the air motor is moving at high speed and much air is flowing through the exhaust line, as would be the case with only a small load (log) on the motor, there will be a relatively high pressure drop across valve 72' in the low speed mode of operation, and there will be a relatively high degree of braking action on the shaft 17, caused by the brake 21 and also by induction at the air motor. These two factors are used simultaneously to modulate the total braking force on the set shaft in accordance with the size of the load or log.

Considering the case where the load imposed on the air motor 16 is heavy and would cause it to substantially stall; under these circumstances, the volume of air exhausting through valve 66 is at a bare minimum, thus only a minor pressure drop will appear across the restrictor valve 72' to be fed as a back pressure to the brake 21. In the case of substantially no load on the air motor 16, motor speed will be maximum and the flow of exhaust from the motor will be of maximum volume and the pressure drop at valve 72' will be high. Therefore, a great braking action will be exerted on the shaft 17 by back pressure to the brake. These conditions are of great importance to the set.

In making a set, the following sequence is observed. The operator selects the thickness to be cut, using the rotary switch, as explained in Pat. No. 3,380,495. He then depresses the set button 22 which causes the proper combination of set and reset to be encoded in the computer 30, as explained in said patent. The two latching relays 38 and 39 are both pulled in simultaneously as previously described. These relays cause brake valve 68 to be deenergized releasing the brake 21; solenoid valve 78 is energized, thereby selecting the high speed mode of forward operation; and the solenoid valve 65 is energized, admitting high pressure air to the forward side of the air motor.

The set begins and accelerates to some speed determined by the load (log) on the air motor, faster if under light load and slower under a very heavy load. The computer 30 begins its counting sequence with the motion of the air motor. When the "slowdown" point is reached, and deceleration of the head blocks 13 should begin, solenoid 78 is deenergized by operation of the slowdown relay. At this point, the free substantially unrestricted exhaust at valve 70 has prevented the buildup of any significant back pressure to the brake 21 to render it active.

Exhaust air must now move through the relatively tortuous path afforded by the valve 72', the deceleration control element. For a fast moving air motor, back pressure will build up fairly quickly and this build up will be imposed at once on the brake 21. The combination of load, back pressure and braking of set shaft 17 by the brake will cause the air motor 16 to react very rapidly and slow down. It should be noticed that a heavy load on the head blocks 13 will tend to slow down the air motor. Thus, when the slowdown signal is achieved, the generation of back pressure and the simultaneous application of external braking on the shaft 17 will be relatively low. It should be clear at this time how the modulation occurs.

On completion of the computer count required for any set, the second relay 39 is actuated back to its original position which first deenergizes solenoid 75 cutting off forward air pressure on the motor 16, then at once energizes solenoid 77 admitting high pressure air to the brake 21. This locks up the set shaft 17 again and the system is once more static and ready for a new command.

The check valve 73 has for its function simply to prevent air exhausting from the brake 21 and out of the valve 70 from backing up through solenoid valve 66 and causing the air motor 16 to rotate slightly in reverse before starting again. This set occur without the check valve 73, and if a set has been dictated, this "rocking" will introduce a false count in the counter 29, where the count generator is located on the air motor shaft. Thus the set will come up "short."

It is to be understood that the form of the invention herewith shown and described is to be taken as a preferred example of the same, and that various changes in the shape, size and arrangement of parts may be resorted to, without departing from the spirit of the invention.

I claim:

1. A brake modulating system for a machine having a rotary shaft subject to a variable load comprising a fluid motor coupled with said shaft to drive it, a fluid operated brake for said shaft to retard rotation of the shaft at prescribed times and under prescribed loads, a source of compressed fluid and conduit means to deliver such fluid to the motor and brake, a brake control valve having a solenoid connected in the conduit means and having an exhaust, a modulating valve for the exhaust of the brake control valve and having a solenoid, a free exhaust outlet and a restricted exhaust outlet, forward and reverse motor control valves having solenoids connected in the conduit means, and computerized electrical circuitry for said machine including connections with the solenoids of all of said valves and relays to initiate the operation of said valves in predetermined sequence.

2. The structure of claim 1, and a one-way check valve means interconnecting the reverse motor control valve with the exhaust of said brake control valve upstream from said modulating valve.

3. The structure of claim 1, and said restricted exhaust outlet of said modulating valve including an adjustable flow restrictor valve.

4. A brake modulating system for a sawmill setworks comprising in combination a set shaft adapted to drive head blocks toward a set position, a fluid operated motor drivingly connected with the set shaft, a fluid operated brake connected with the set shaft, conduit means for conveying pressurized fluid to and from said motor and brake, forward and reverse motor control valves in the conduit means, a brake control valve in the conduit means having an exhaust line, a modulating valve connected in the exhaust line of the brake control valve and including a restricted outlet, and computerized means to operate said valves in a prescribed sequence to regulate the deceleration of the set shaft by the brake and motor in accordance with the loading thereon imposed through the head blocks.

5. The structure of claim 4, and said restricted outlet embodying a valve whose function is to build back pressure in a conduit section leading between the modulating valve and brake through the brake control valve to increase the activity of the brake on the set shaft.

6. The structure of claim 5, and the building of said back pressure and imposing the same on said brake simultaneously produces a braking action on the set shaft by induction at said fluid operated motor.

7. The structure of claim 4, and said fluid operated motor and brake comprise a pneumatic motor and brake and said pressurized fluid is air.

8. The structure of claim 7, and said conduit means comprises a compressed air source, a main compressed air conduit extending from said source and having a main control valve, branch conduits leading from the main conduit and connected with said valves for controlling the motor and brake, and a check valve means interconnecting the reverse motor control valve and the exhaust of the brake control valve.